US008650373B2

(12) United States Patent
Hatsuda et al.

(10) Patent No.: US 8,650,373 B2
(45) Date of Patent: Feb. 11, 2014

(54) MEMORY SYSTEM, CONTROLLER, AND DATA TRANSFER METHOD

(75) Inventors: Kosuke Hatsuda, Tokyo (JP); Daisaburo Takashima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 761 days.

(21) Appl. No.: 12/860,160

(22) Filed: Aug. 20, 2010

(65) Prior Publication Data

US 2011/0055462 A1    Mar. 3, 2011

(30) Foreign Application Priority Data

Aug. 28, 2009   (JP) .................................. 2009-198367

(51) Int. Cl.
*G06F 12/00* (2006.01)
*G06F 13/00* (2006.01)

(52) U.S. Cl.
USPC ............ 711/162; 711/100; 711/103; 711/154

(58) Field of Classification Search
USPC .................. 711/100, 103, 154, 162, 163, 170
See application file for complete search history.

(56) References Cited

U.S. PATENT DOCUMENTS

| 5,437,022 | A * | 7/1995 | Beardsley et al. ............ 714/6.1 |
| 2007/0016719 | A1 * | 1/2007 | Ono et al. ..................... 711/103 |
| 2008/0028132 | A1 | 1/2008 | Matsuura et al. |
| 2008/0126671 | A1 * | 5/2008 | Kashiwada ................... 711/101 |
| 2008/0250188 | A1 | 10/2008 | Nakanishi et al. |
| 2009/0248964 | A1 | 10/2009 | Yano et al. |
| 2009/0327589 | A1 * | 12/2009 | Moshayedi .................... 711/103 |

FOREIGN PATENT DOCUMENTS

| JP | 2000-99405 | 4/2000 |
| JP | 2002-342173 | 11/2002 |
| JP | 2006-338083 | 12/2006 |
| JP | 2007-94921 | 4/2007 |
| JP | 2008-33788 | 2/2008 |
| WO | WO 2006/067923 A1 | 6/2006 |

OTHER PUBLICATIONS

Japanese Office Action issued Oct. 11, 2011, in Patent Application No. 2009-198367 (with English-language translation).
U.S. Appl. No. 13/069,963, filed Mar. 23, 2011, Hashimoto.

* cited by examiner

*Primary Examiner* — Tuan Thai
(74) *Attorney, Agent, or Firm* — Oblon, Spivak, McClelland, Maier & Neustadt, L.L.P.

(57) ABSTRACT

According to one embodiment, a memory system includes a nonvolatile first memory, a nonvolatile second memory, a data-copy processing unit and a data invalidation processing unit. The first memory has a storage capacity for n ($n \geq 2$) pages per word line. The nonvolatile second memory temporarily stores user data write-requested from a host apparatus. The data-copy processing unit executes data copy processing including reading out, in page units, the user data stored in the second memory and sequentially writing the read-out user data in page units in the first memory. The data invalidation processing unit selects, after the execution of the data copy processing, based on whether the memory cell group per word line stores user data for n pages, user data requiring backup out of the user data subjected to the data copy processing and leaves the selected user data in the second memory as backup data.

21 Claims, 12 Drawing Sheets

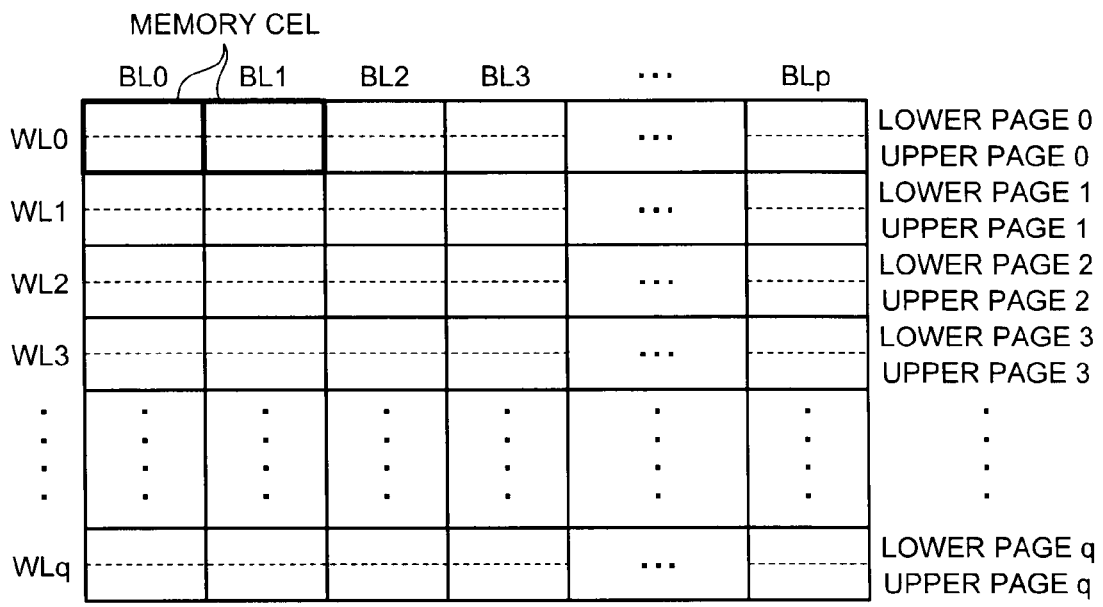

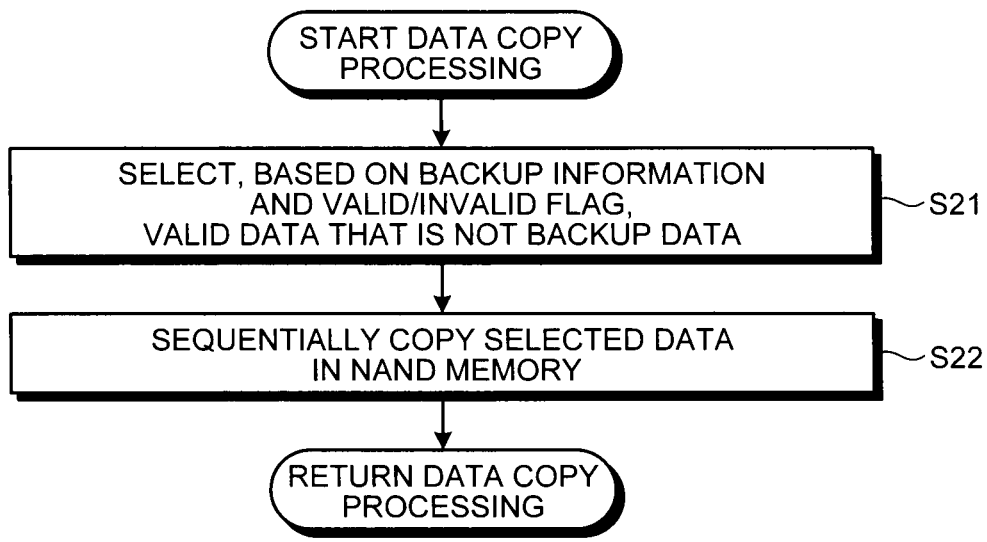
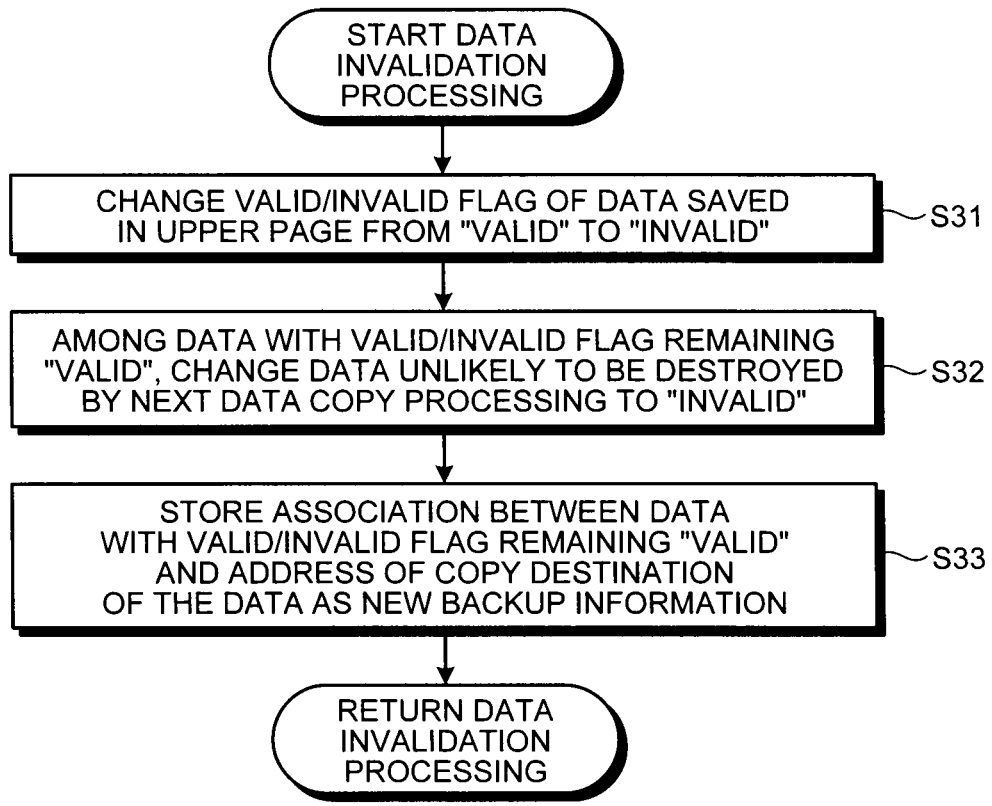

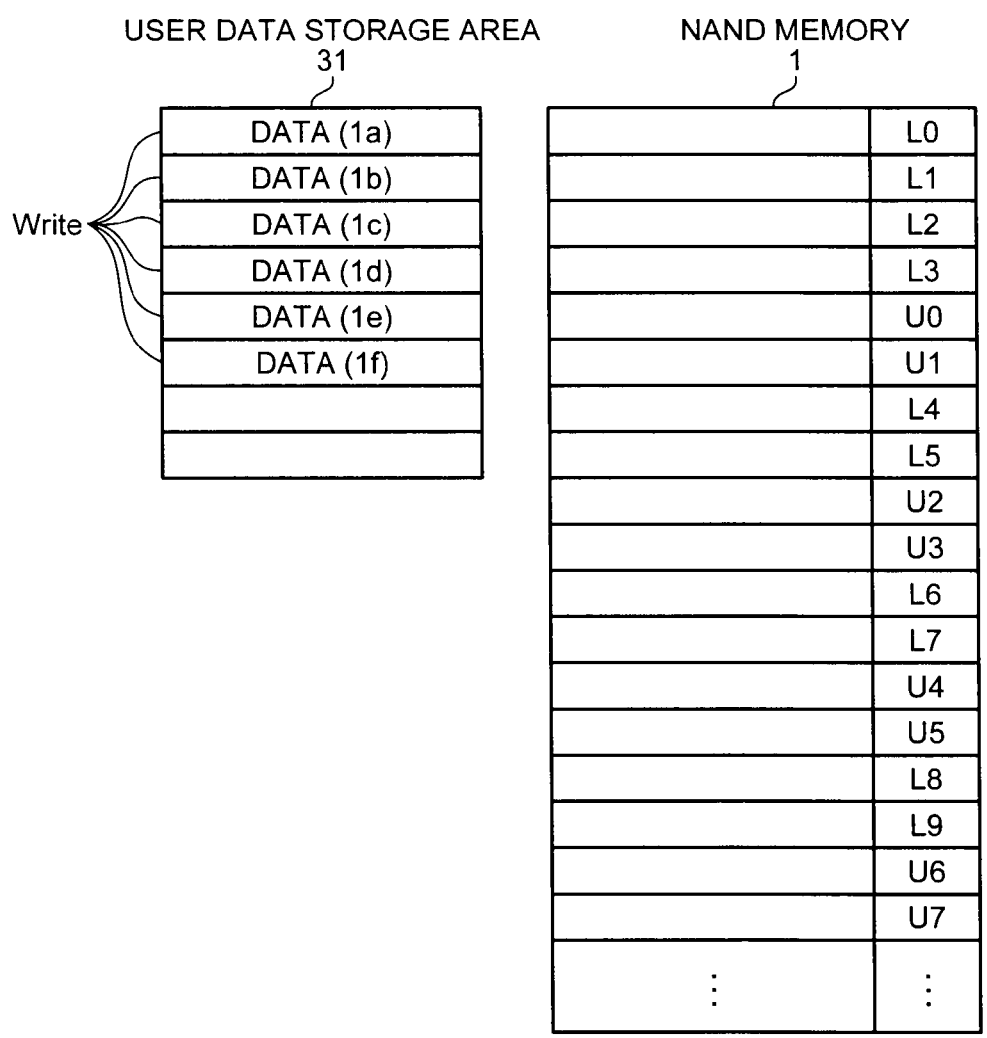

MEMORY SYSTEM, CONTROLLER, AND DATA TRANSFER METHOD

CROSS-REFERENCE TO RELATED APPLICATIONS

This application is based upon and claims the benefit of priority from the prior Japanese Patent Application No. 2009-198367, filed on Aug. 28, 2009; the entire contents of which are incorporated herein by reference.

FIELD

Embodiments described herein relate generally to a memory system, a controller, and a data transfer method.

BACKGROUND

A NAND flash memory (hereinafter simply referred to as "NAND memory") as a nonvolatile memory has advantages such as high speed and light weight compared with a hard disk. An increase in a capacity and an increase in a degree of integration of the NAND memory are easily performed compared with other flash memories including a NOR flash memory. A solid state drive (SSD) mounted with the NAND memory having these characteristics attracts attention as a large-capacity external storage device replacing a magnetic disk device.

As one of problems in replacing the magnetic disk device with the SSD mounted with the NAND memory, the number of times of reading and writing (in particular, writing) accesses that the NAND memory can withstand (the limited number of accesses) is small. As one of solutions for the problem, data is written in the NAND memory through a memory (a random access memory (RAM)) readable and writable at high speed such as a dynamic RAM (DRAM). Specifically, small volume data transmitted from a host apparatus is stored in the RAM and, when the small volume data can be treated as large volume data, the data stored in the RAM is written in the NAND memory in large units such as block units (see, for example, Japanese Patent Application Laid-Open No. 2008-33788). In a system often adopted, concerning data that needs to be written in the NAND memory while being maintained as the small volume data, writing in page unit in block is performed in page units to reduce fatigue of the NAND memory.

In recent years, as the NAND memory, there are an increasing number of NAND memories to which a multi-value technology for storing a plurality of bits in one cell is applied. For example, in a NAND memory that can store two bits in one cell, the bits stored in the one cell are referred to as lower bit and upper bit in order of writing. A page including the lower bit is referred to as lower page and a page including the upper bit is referred to as upper page.

As the SSD that performs writing in the NAND memory via the RAM explained above, there are an increasing number of SSDs in which a multi-value NAND memory is applied to the NAND memory. In such SSDs, attention needs to be paid when intra-block write-once is performed in page units. This is because, if a writing error (a program error, instantaneous stop, etc.) occurs while data is written in the upper page, data stored in the lower page cannot be guaranteed. Therefore, backup of the lower page with respect to the upper page at a writing destination is necessary until the writing in the upper page ends without a trouble. In the past, when data that cannot be guaranteed is present when writing in the NAND memory is performed, operation for backing up the data in another block in the NAND memory is performed. The operation causes a fall in writing speed of the SSD.

BRIEF DESCRIPTION OF THE DRAWINGS

FIGS. 3A and 3B are diagrams for explaining an example of order of writing in a NAND memory;

FIG. 7 is a flowchart for explaining data copy processing more in detail;

FIG. 8 is a flowchart for explaining data invalidation processing more in detail;

FIG. 9 is a diagram for specifically explaining a state in which backup is performed;

DETAILED DESCRIPTION

In general, according to one embodiment, a memory system includes a nonvolatile first memory, a nonvolatile second memory, a data-copy processing unit and a data invalidation processing unit. The first memory has a storage capacity for n ($n \geq 2$) pages in a memory cell group per word line. The nonvolatile second memory temporarily stores user data write-requested from a host apparatus. The data-copy processing unit executes, at predetermined timing, data copy processing including reading out, in page units, the user data stored in the second memory and sequentially writing the read-out user data in page units in the first memory. The data invalidation processing unit selects, after the execution of the data copy processing, based on whether the memory cell group per word line stores user data for n pages, user data requiring backup out of the user data subjected to the data copy processing, which is stored in the second memory, and leaves the selected user data in the second memory as backup data and invalidates the user data subjected to the data copy processing on the second memory excluding the backup data.

Exemplary embodiments of a memory system, a controller, and a data transfer method will be explained below in detail with reference to the accompanying drawings. The present invention is not limited to the following embodiments.

Figure 1:
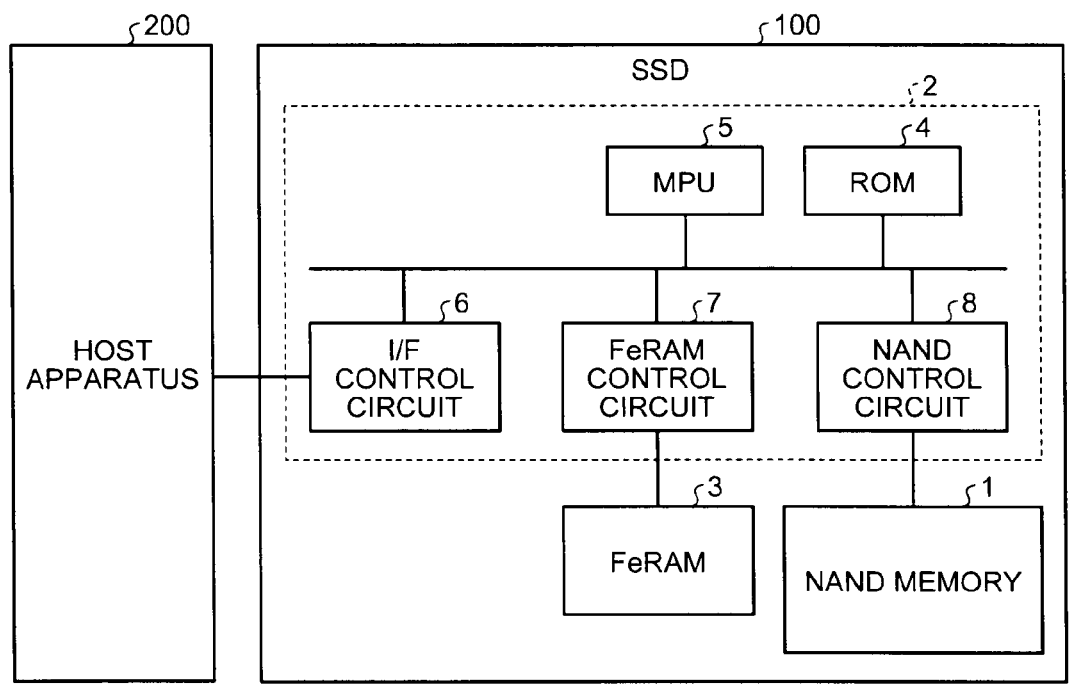
FIG. 1 is a diagram for explaining the configuration of a host apparatus and a memory system (an SSD) according to an embodiment.

FIG. 1 is diagram for explaining the configuration of a host apparatus and a memory system. In an embodiment, an SSD including a NAND flash memory (hereinafter, "NAND memory") as a nonvolatile semiconductor memory having a connection interface standard (an ATA standard) same as that for a hard disk drive (HDD) is explained as an example of the memory system.

An SSD 100 is connected to a host apparatus 200 such as a personal computer or a CPU core via a memory connection interface such as an ATA interface. The SSD 100 functions as an external storage device of the host apparatus 200. The SSD 100 includes a NAND memory 1 as a first memory in which user data (hereinafter, "data") written in and read out from the host apparatus 200 is stored, a controller 2 that controls data transfer between the host apparatus 200 and the NAND memory 1, and a ferroelectric random access memory (FeRAM) 3 as a second memory in which data write-requested from the host apparatus 200 is temporarily accumulated. The data (user data) write-requested from the host apparatus 200 is written in the NAND memory 1 via the FeRAM 3.

The controller 2 controls the NAND memory 1 and the FeRAM 3 to perform control of the data transfer between the host apparatus 200 and the NAND memory 1. As a configuration for performing the data transfer control, the controller 2 further includes components explained below. The controller 2 includes a read only memory (ROM) 4, a micro processor unit (MPU) 5, an interface (I/F) control circuit 6, a FeRAM control circuit 7, and a NAND control circuit 8.

The I/F control circuit 6 transmits and receives user data to and from the host apparatus 200 via the ATA interface. The FeRAM control circuit 7 transmits and receives user data to and from the FeRAM 3. The NAND control circuit 8 transmits and receives user data to and from the NAND memory 1.

A boot program for booting a management program (firmware) stored in the NAND memory 1 is stored in the ROM 4. The MPU 5 boots the firmware, expands the firmware on the FeRAM 3, and controls the entire controller 2 based on the firmware expanded on the FeRAM 3.

Figure 2A:
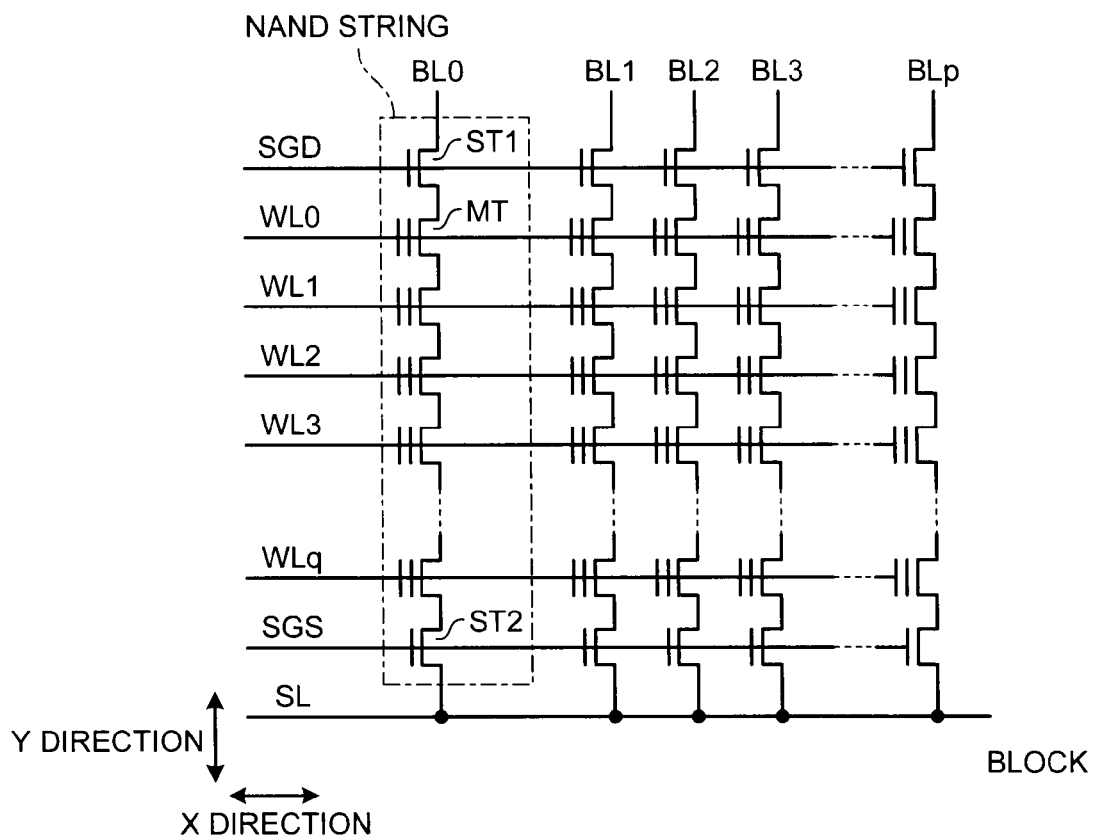
FIGS. 2A and 2B are diagrams for explaining a physical block of a NAND memory chip.

The NAND memory 1 includes one or more NAND memory chips. Each of the NAND memory chips is configured by arraying a plurality of physical blocks that are units of data erasing. FIG. 2A is an equivalent circuit diagram of a configuration example of one physical block included in the NAND memory chip. Each of the physical blocks includes (p+1) NAND strings arrayed in order along an X direction (p is an integer equal to or larger than 0). Drains of selection transistors ST1 respectively included in the (p+1) NAND strings are connected to bit lines BL0 to BLp. Gates of the selection transistors ST1 are connected in common to a selection gate line SGD. Sources of selection transistors ST2 are connected in common to a source line SL. Gates of the selection transistors ST2 are connected in common to a selection gate line SGS.

Each of memory cell transistors MT includes a metal oxide semiconductor field effect transistor (MOSFET) having a laminated gate structure formed on a semiconductor substrate. The laminated gate structure includes a charge accumulation layer (a floating gate electrode) formed on the semiconductor substrate via a gate insulation film and a control gate electrode formed on the charge accumulation layer via an inter-gate insulation film. In the memory cell transistor MT, a threshold voltage changes according to the number of electrons stored in the floating gate electrode. The memory cell transistor MT stores data according to a difference in the threshold voltage. The memory cell transistor MT is configured to store multiple values (data equal to or lager than 2 bits).

The memory cell transistor MT is not limited to the structure having the floating gate electrode and can be a structure such as a metal-oxide-nitride-oxide-silicon (MONOS) structure that can adjust a threshold by causing a nitride film interface as a charge accumulation layer to trap electrons.

In each of the NAND strings, (q+1) memory cell transistors MT area arranged between a source of the selection transistor ST1 and a drain of the selection transistor ST2 such that current paths of the transistors are connected in series. In other words, a plurality of the memory cell transistors MT are connected in series in a Y direction to share a diffusion region (a source region or a drain region) between the memory cell transistors MT adjacent to each other.

Control gate electrodes are respectively connected to word lines WL0 to WLq in order from the memory cell transistor MT on the most drain side. Therefore, a drain of the memory cell transistor MT connected to the word line WL0 is connected to the source of the selection transistor ST1. A source of the memory cell transistor MT connected to the word line WLq is connected to the drain of the selection transistor ST2.

The word lines WL0 to WLq connect the control gate electrodes of the memory cell transistors MT in common among the NAND strings in the physical block. In other words, the control gate electrodes of the memory cell transistors MT on the same row in the block are connected to the same word line WL. (p+1) memory transistors MT connected to the same word line WL are treated as one page (physical page). Writing and readout of data are performed for each physical page.

The bit lines BL0 to BLp connect drains of the selection transistors ST1 in common among the blocks. In other words, the NAND strings on the same column in the blocks are connected to the same bit line BL.

Figure 2B:
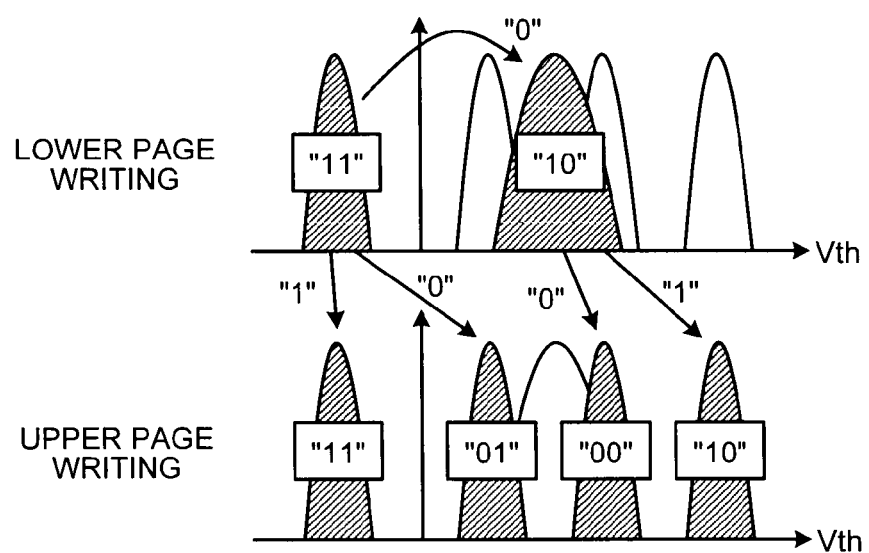

In some case, a plurality of bits can be stored per memory transistor MT. For example, when n (n≥2) bits can be stored per memory transistor MT, a storage capacity per word line is equal to size for n pages. FIG. 2B is a schematic diagram of a threshold distribution in, for example, a quaternary data storage system for storing two bits in one memory cell transistor MT. In the quaternary data storage system, data for two pages can be stored per memory transistor MT. A page to be written earlier is referred to as lower page and a page to be written after the lower page is referred to as upper page.

The memory cell transistor MT can store any one of quaternary data "xy" defined by upper page data "x" and lower page data "y". As the quaternary data "xy", for example, data "11", "01", "00", and "10" are allocated in order of threshold voltages of the memory cell transistors MT. The data "11" is in an erased state in which the threshold voltage of the memory cell transistor MT is negative. A rule for allocation of data is not limited to this. In this embodiment, one memory transistor MT that can store a value of 2 bits is explained below as an example. However, it is also possible that one memory cell MT stores a value equal to or larger than 3 bits. In the following explanation, in some case, the memory cell transistor Mt is simply referred to as memory cell.

In a lower page writing operation, the data "10" is selectively written in the memory cell of the data "11" (the erased state) by writing of the lower bit data "y". In an upper page writing operation, writing of the upper bit data "x" is selectively performed and the data "01" and the data "00" are respectively written in the memory cell of the data "11" and the memory cell of the data "10". A threshold distribution of the data "10" before the upper page writing is about in the middle of threshold distributions of the data "01" and the data "00" after the upper page writing. In general, the threshold distribution is broader than a threshold distribution after the upper page writing.

During writing of user data, the threshold voltages of the memory cells fluctuate because of the influence of coupling capacitance between adjacent memory cells. Therefore, to reduce the influence of the coupling capacitance between the adjacent memory cells, writing order is contrived to separate a lower page and an upper page at a writing destination. FIGS. 3A and 3B are diagrams for explaining an example of order of writing in the NAND memory 1. As shown in FIG. 3A, first, with i set to an integer equal to or larger than zero, a lower page of a memory cell group connected to a word line WLi is represented as Lower Page i and an upper page of the memory cell group is represented as Upper Page i. Then, as shown in FIG. 3B, after writing of two lower pages (a lower page 0 and a lower page 1) at the top of a bank is performed, writing is executed in order of (1) a lower page 2i+2, (2) a lower page 2i+3, (3) an upper page 2i, and (4) an upper page 2i+1. When the writing of (4) ends, i is incremented by 1 and writing in a writing destination indicated by (1) is executed. In this way, the writing in the lower page (1) and (2) and the writing in the upper page (3) and (4) executed following the writing (1) and (2) are separated by several word lines (in this case, two word lines).

Referring back to FIG. 1, as explained above, data write-requested from the host apparatus 200 is temporarily accumulated in the FeRAM 3 under the control by the controller 2. When an event in which the data stored in the FeRAM 3 should be saved in the NAND memory 1 occurs, the data is copied to the NAND memory 1 and user data stored in the FeRAM 3 is invalidated. A series of processing from the data copying to the NAND memory 1 to the invalidation of the user data is referred to as saving processing. Timing when the saving processing is executed is not specifically limited. However, in the following explanation, it is assumed that the saving processing is executed when the user data accumulated in the FeRAM 3 reaches size equivalent to a predetermined number of pages. In the following explanation, the size for one page indicates the size of one upper page (or lower page). As the second memory of the SSD 100, a memory other than the FeRAM 3 can also be used as long as the memory is nonvolatile and access to the memory can be performed at speed higher than access speed to the NAND memory 1. For example, a magnetoresistive random access memory (MRAM) can be used instead of the FeRAM 3.

Figure 4:
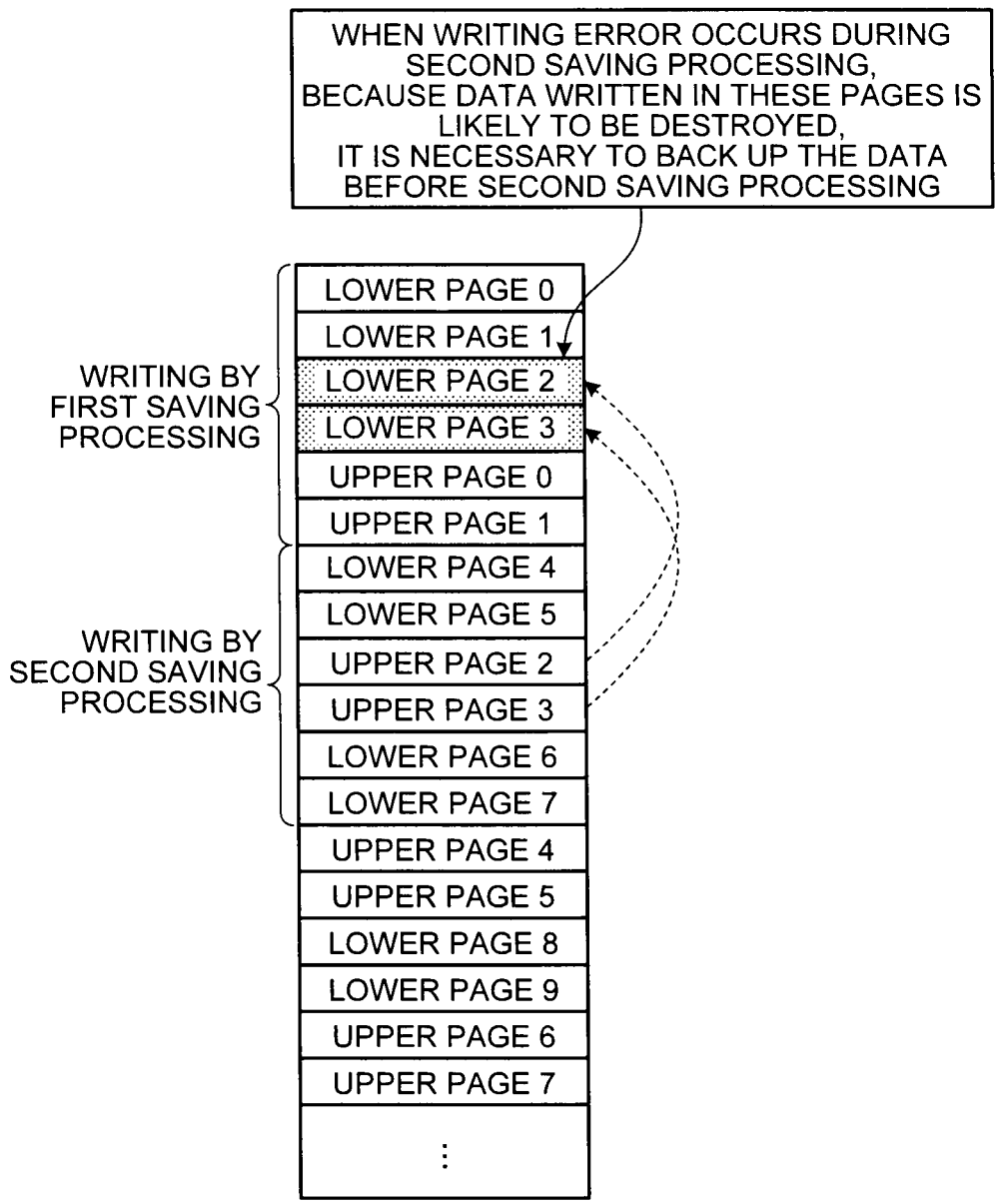
FIG. 4 is a diagram for explaining a state in which saving processing from a FeRAM to the NAND memory is performed twice.

As already explained concerning the threshold distribution example shown in FIG. 2B, the threshold distribution of the data "10" before the upper page writing is about in the middle of the threshold distributions of the data "01" and the data "00" after the upper page writing. Therefore, when an error occurs in writing upper bit data in a memory cell in which lower bit data "y"="0" is written, it is unknown whether the lower bit data is "1" or "0". In other words, when an error occurs during upper page writing, it is likely that data in the lower page is destroyed. FIG. 4 is a diagram for explaining a state in which the saving processing is performed from the FeRAM 3 to the NAND memory 1 twice. User data is written in lower pages 0, 1, 2, and 3 and upper pages 0 and 1 by the first saving processing. User data is written in lower pages 4, 5, 6, and 7 and upper pages 2 and 3 by the second saving processing. When a user fails in the writing in the upper pages 2 and 3 in the second saving processing, it is likely that the data written in the lower pages 2 and 3 by the first saving processing is destroyed.

Therefore, in the past, in preparation for data destruction during occurrence of a writing error, user data likely to be destroyed is backed up in the NAND memory 1 before the saving processing is executed. However, the addition of the backup processing causes a fall in writing speed. On the other hand, according to this embodiment, the FeRAM 3 as a nonvolatile memory is used as a memory for temporarily accumulating user data write-requested from the host apparatus 200. User data likely to be destroyed by the next and subsequent saving processing is left in the FeRAM 3. The user data left in the FeRAM 3 is used as backup data. This makes it possible to perform efficient backup with the fall in writing speed suppressed.

Figure 5:
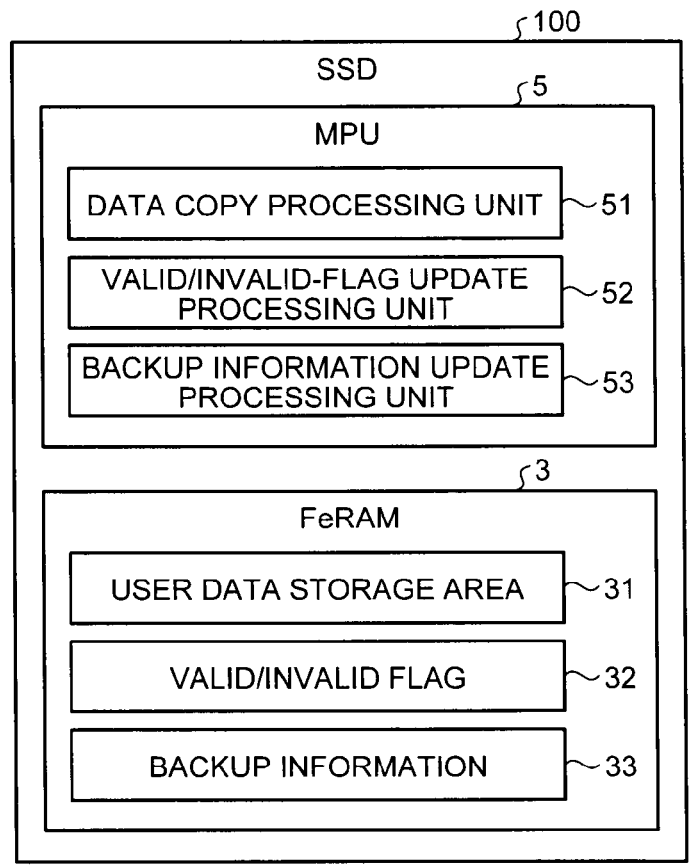
FIG. 5 is a diagram for explaining a functional configuration of the SSD according to the embodiment.

FIG. 5 is a diagram for explaining a functional configuration for performing the efficient backup explained above. As shown in the figure, a user data storage area 31 as an area for accumulating and storing user data is secured in the FeRAM 3. The FeRAM 3 has stored therein a valid/invalid flag 32 for managing, in page units, whether user data stored in the user data storage area 31 is valid or invalid. A state in which user data is invalid indicates a state in which the user data is erased.

The FeRAM 3 has further stored therein backup information 33 for managing, in page units, whether valid user data stored in the user data storage area 31 is backup data. When a memory cell group per word line at a writing destination (a copy destination) does not store user data for two pages, in other words, when the writing destination is a lower page and writing in an upper page in a memory cell group same as that of the lower page is not performed, the user data is used as backup data. In the backup information 33, a correspondence relation between backup data and a copy destination address in the NAND memory 1 of the backup data is described.

The MPU 5 includes a data copy processing unit 51 that copies, based on the valid/invalid flag 32 and the backup information 33, valid user data, which is not backup data, accumulated and stored in the user data storage area 31 to the NAND memory 1, a valid/invalid flag update processing unit 52 that updates and manages the valid/invalid flag 32 according to content of the copy operation after the data copy processing unit 51 copies the user data; and a backup information update processing unit 53 that updates and manages the backup information 33.

Figure 6:
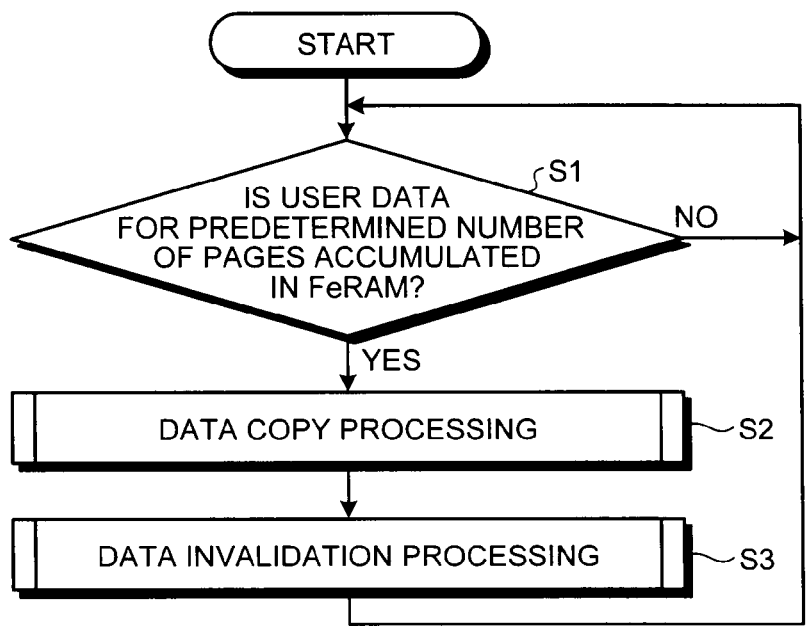
FIG. 6 is a flowchart for explaining the operation of the saving processing of the SSD according to the embodiment.

The operation of the SSD 100 according to this embodiment is explained with reference to FIGS. 6 to 8. FIG. 6 is a flowchart for explaining the operation of the saving processing by the SSD 100.

As shown in FIG. 6, first, the data copy processing unit 51 determines whether user data for a predetermined number of pages is accumulated in the user data storage area 31 of the FeRAM 31 (step S1). When the user data for the predetermined number of page is accumulated ("Yes" at step S1), the data copy processing unit 51 executes data copy processing (step S2). When the user data for the predetermined number of pages is not accumulated ("No" at step S1), the data copy processing unit 51 continues the determination processing at step S1.

FIG. 7 is a flowchart for explaining the data copy processing more in detail. As shown in the figure, when the data copy processing is started, the data copy processing unit 51 selects, referring to the valid/invalid flag 32 and the backup information 33, valid user data (hereinafter, the valid user data is simply referred to as "valid data"), which is not backup data, out of user data stored in the user data storage area 31 (step S21). The data-copying processing unit 51 sequentially copies the valid data selected at step S21 to the NAND memory 1 (step S22). When the copying is completed, the data copy processing is returned to the start. In this way, the data copy processing unit 51 discriminates, based on the backup information 33, the user data into backup data, which is user data subjected to the data copy processing, and user data not subjected to the data copy processing. The data copy processing unit 51 copies the user data not subjected to the data copy processing to the NAND memory 1.

Referring back to FIG. 6, data invalidation processing is executed (step S3). The data invalidation processing is processing for leaving, as backup data, user data requiring backup on the FeRAM 3 out of the user data subjected to the data copy processing, which is stored in the FeRAM 3, and erasing (invalidating) the user data subjected to the data copy processing excluding the backup data from the FeRAM 3. The data invalidation processing is executed by cooperation of the valid/invalid flag update processing unit 52, the backup information update processing unit 53, the valid/invalid flag 32, and the backup information 33. After the data invalidation processing, the saving processing shifts to step S1.

FIG. 8 is a flowchart for explaining the data invalidation processing more in detail. As shown in the figure, when the data invalidation processing is started, the valid/invalid flag update processing unit 52 edits the valid/invalid flag 32 and invalidates user data to be copied to an upper page among the valid data copied by the data copy processing executed immediately before the data invalidation processing (step S31). According to the processing at step S31, among the user data as the backup data and the valid data copied by the data copy processing executed immediately before the data invalidation processing, the user data to be copied to the lower page is still "valid". Following step S31, the valid/invalid flag update processing unit 52 further edits the valid/invalid flag 32 and invalidates, among the "valid" user data, user data to be copied to a lower page of a memory cell group in which data is stored in an upper page (step S32). Consequently, user data to be copied to a lower page of a memory cell group in which data is not stored in an upper page, i.e., user data requiring backup remains in the user data storage area 31 as valid data. The backup information update processing unit 53 selects the user data still remaining as the valid data through the processing at step S32 and stores association between the selected user data and an address of a copy destination of the user data as the backup information 33 (step S33). The data invalidation processing is returned to the start.

FIGS. 9 to 14 are diagrams for specifically explaining a state in which backup is performed according to the operation explained above. It is assumed that, when user data for six or more pages are accumulated at step S1, the data copy processing unit 51 shifts to the data copy processing (step S2).

In FIG. 9, a state in which user data (data (1a) to data (1f)) for six pages are written in the user data storage area 31 is shown. It is assumed that there is no backup data at a stage when the data (1a) to the data (1f) are written.

Figure 10:
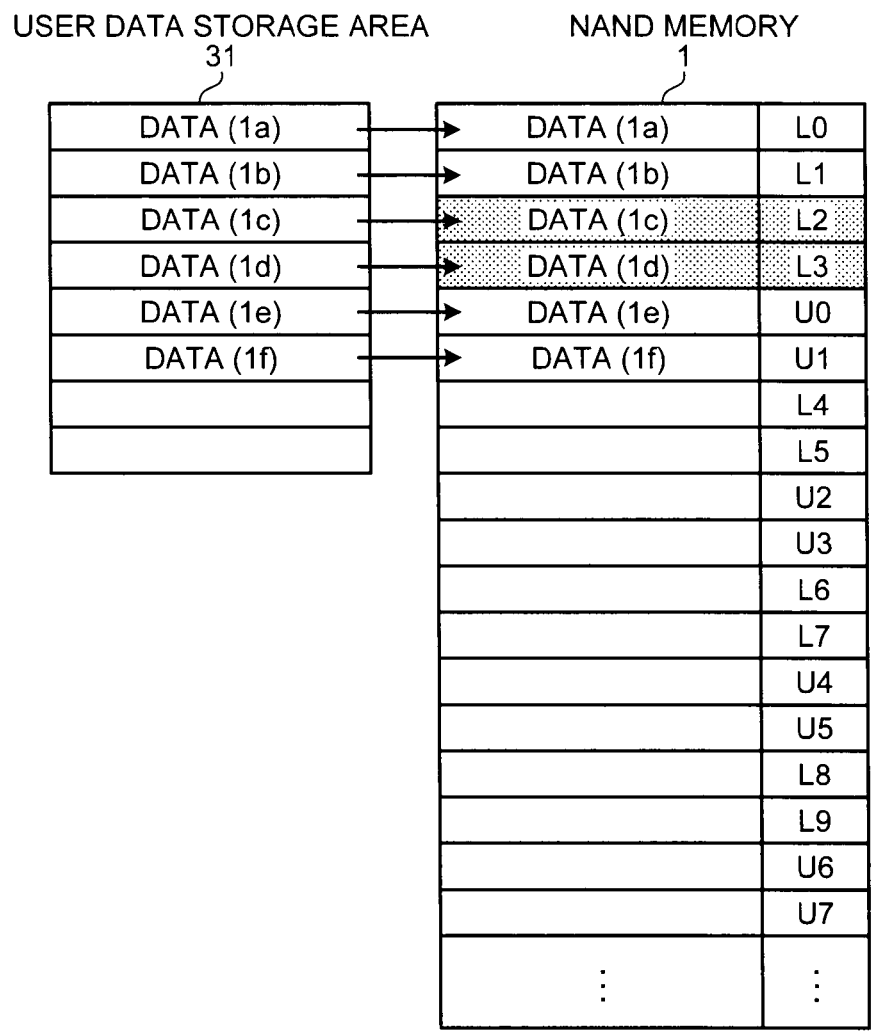
FIG. 10 is a diagram for specifically explaining the state in which backup is performed.

FIG. 10 is a diagram for explaining a state in which the data (1a) to the data (1f) are copied to the NAND memory 1 by the data copy processing unit 51. As shown in the figure, the data (1a) to the data (1f) are respectively written in a lower page 0 (L0), a lower page 1 (L1), a lower page 2 (L2), a lower page 3 (L3), an upper page 0 (U0), and an upper page 1 (U1). In the present data copy processing, no data is written in U2 and U3 corresponding to upper pages of memory cells of L2 and L3. Data is written in U2 and U3 by the next and subsequent data copy processing. Therefore, the data (1c) and the data (1d) are left as backup data.

Figure 11:
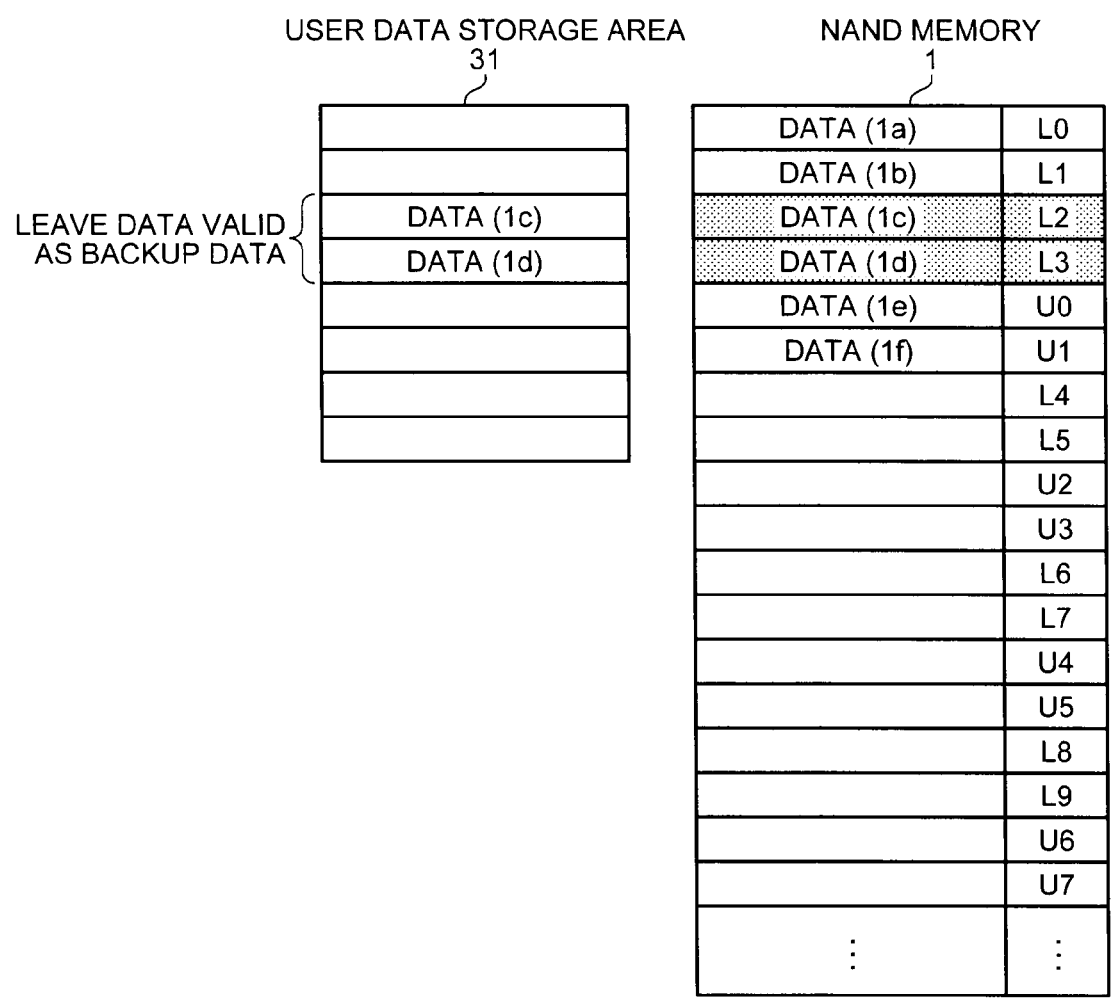
FIG. 11 is a diagram for specifically explaining the state in which backup is performed.

FIG. 11 is a diagram for explaining a state in which the backup data is left. As shown in the figure, the data (1c) and the data (1d) are left in the user data storage area 31 while being kept valid.

Figure 12:
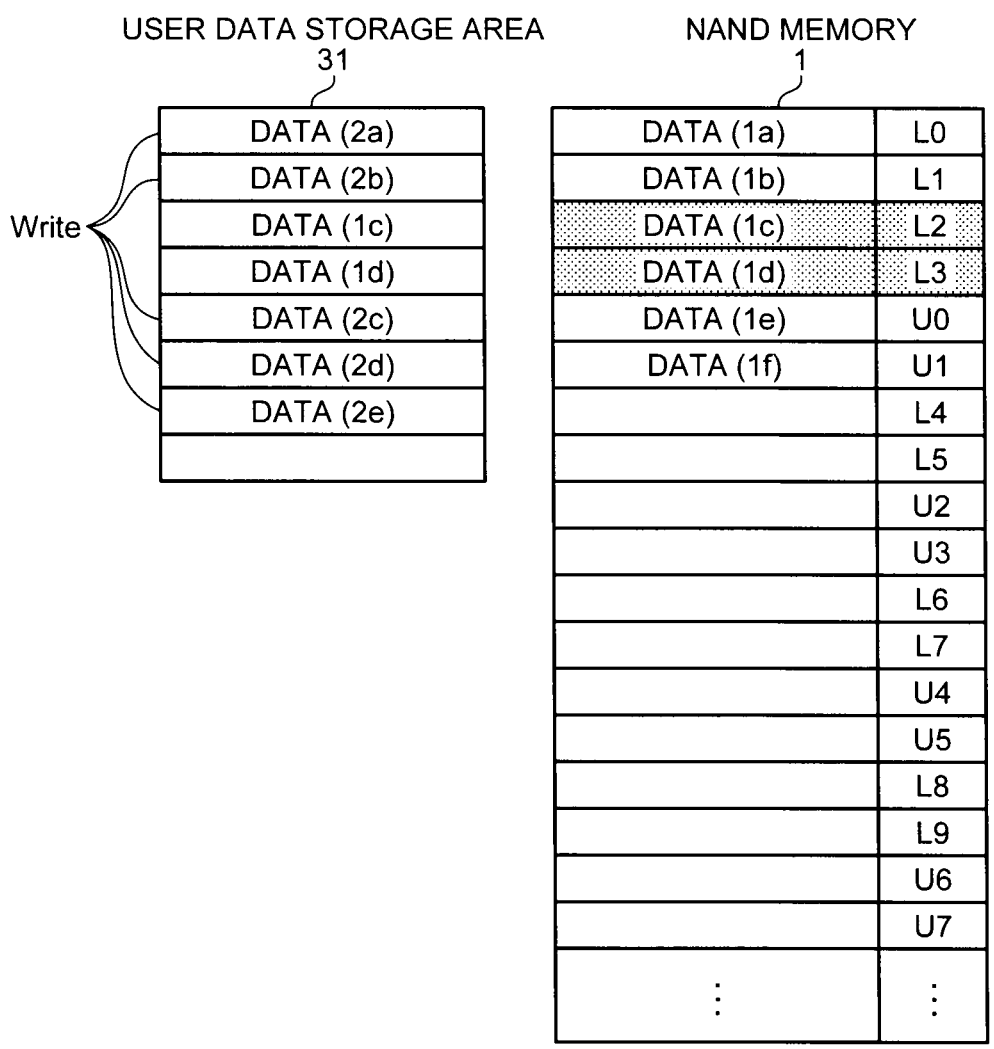
FIG. 12 is a diagram for specifically explaining the state in which backup is performed.

In FIG. 12, a state in which new user data (data (2a), data (2b), data (2c), data (2d), and data (2e)) are further written in the user data storage area 31 is shown.

Figure 13:
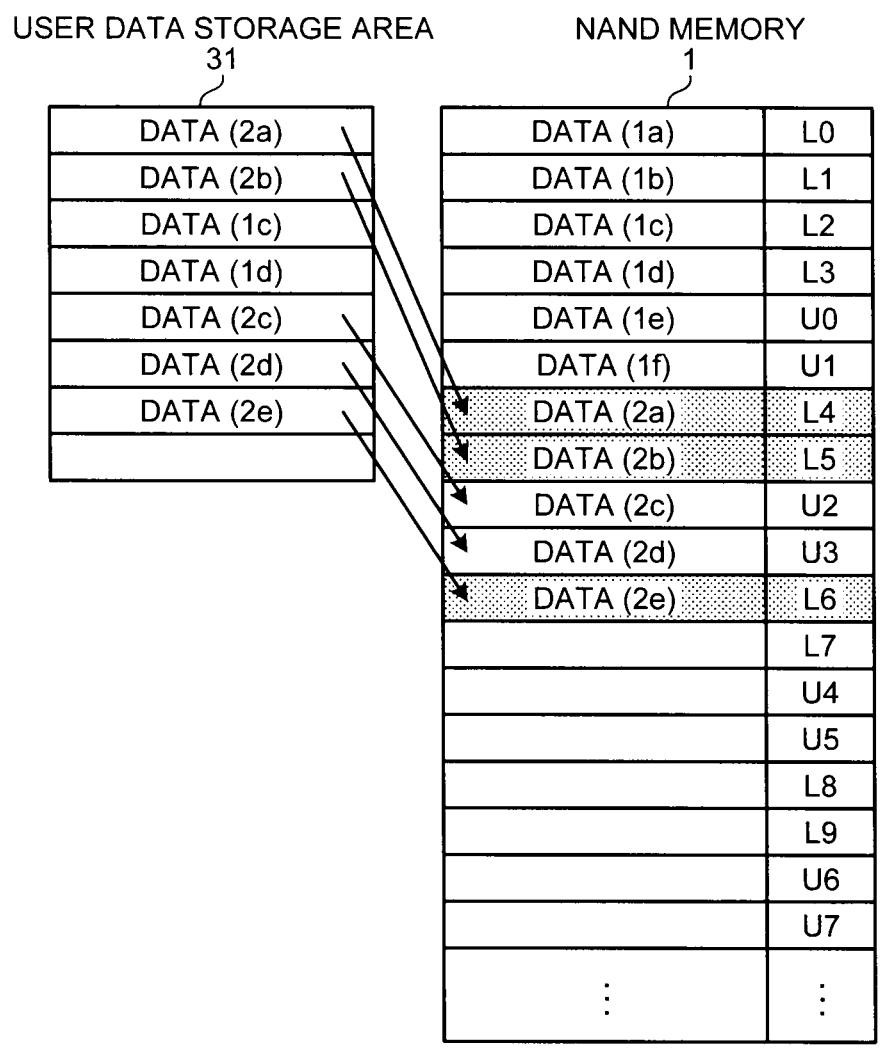
FIG. 13 is a diagram for specifically explaining the state in which backup is performed.

FIG. 13 is a diagram for explaining a state in which the data (2a) to the data (2e) are copied to the NAND memory 1 by the data copy processing unit 51. As shown in the figure, the data (2a), the data (2b), the data (2c), the data (2d), and the data (2e) are respectively copied to the lower page 4 (L4), the lower page 5 (L5), the upper page 2 (U2), the upper page 3 (U3), and the lower page 6 (L6). Then, because the data is written in the upper pages U2 and U3 of the memory cell group of L2 and L3, user data to be copied to L2 and L3 do not need to be backed up. Because data is not written in the upper page 4 (U4), the upper page 5 (U5), and the upper page 6 (U6) by the present data copy processing, the user data written in L4, L5, and L6 anew are user data requiring backup.

Figure 14:
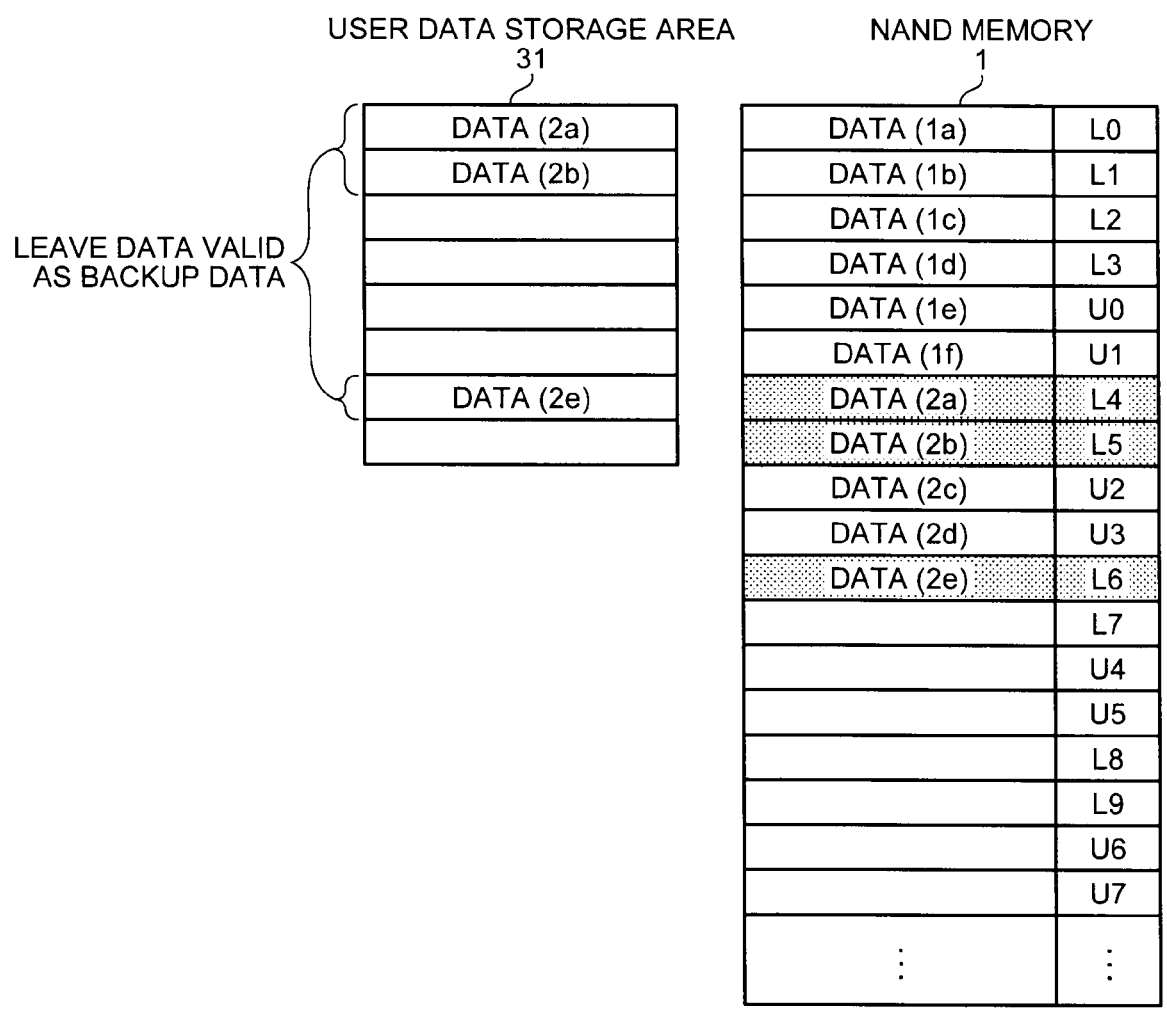
FIG. 14 is a diagram for specifically explaining the state in which backup is performed.

FIG. 14 is a diagram for explaining a state in which backup data is left. As shown in the figure, the data (2a), the data (2b), and the data (2c) to be respectively copied to L4, L5, and L6 are left in the user data storage area 31 as backup data without being erased.

In the above explanation, the NAND memory 1 having the storage capacity of 2 bits per memory cell is explained as the example. However, this embodiment can also be applied to a memory system including a NAND memory having a storage capacity equal to or larger than 3 bits. In a memory system including a NAND memory having a storage capacity of n bits, when a memory cell group per word line does not store user data for n pages, it is advisable to leave user data to be written in the memory cell group in the FeRAM 3 as backup data.

The valid/invalid flag 32 and the backup information 33 are explained above as being stored in the FeRAM 3. However, a storage destination of the valid/invalid flag 32 and the backup information 33 does not have to be the FeRAM 3. For example, the valid/invalid flag 32 and the backup information 33 can be stored in the NAND memory 1. A memory or a register can be separately provided in the SSD 100 in small size. The valid/invalid flag 32 and the backup information 33 can be stored in the memory or the register.

As explained above, according to the embodiment of the present invention, the memory cell group per word line includes the NAND memory 1 having the storage capacity for n (n≥2) pages, the FeRAM 3 that temporarily stores user data write-requested from the host apparatus 200, the data copy processing unit 51 that executes, at predetermined timing, the data copy processing for reading out, in page units, the user data stored in the FeRAM 3 and sequentially writing the read-out user data in page units in the NAND memory 1, and a data invalidation processing unit that selects, after the execution of the data copy processing, based on whether a memory cell group per word line at a writing destination stores user data for n pages, user data requiring backup out of user data subjected to the data copy processing, which is stored in the FeRAM 3, and executes the data invalidation processing for leaving the selected user data in the FeRAM 3 as backup data and invalidating the user data subjected to the data copy processing on the FeRAM 3 excluding the backup data (the data invalidation processing is executed by cooperation of the valid/invalid flag update processing unit 52, the backup information update processing unit 53, the valid/invalid flag 32, and the backup information 33). Therefore, it is unnecessary to provide a storage area exclusively for backup. Because processing for moving the backup data to an area exclusively for backup does not have to be performed, a fall in data writing speed can be suppressed. In other words, according to the embodiment of the present invention, it is possible to efficiently back up data likely to be lost when a writing error occurs.

As information for determining whether the user data stored in the FeRAM 3 is backup data or user data not subjected to the data copy processing, the FeRAM 3 includes the backup information 33 for associating, for each of pages, backup data and a writing destination address in the NAND memory 1 of the backup data.

The data copy processing unit 51 discriminates, based on the backup information 33, the user data stored in the FeRAM 3 into the backup data and the user data not subjected to the data copy processing and executes the data copy processing on the user data not subjected to the data copy processing. Therefore, it is possible to eliminate a waste of repeatedly saving the backup data, i.e., user data once saved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile first memory in which a memory cell group per word line has a storage capacity for n (n≥2) pages;
a nonvolatile second memory that temporarily stores user data write-requested from a host apparatus;
a data-copy processing unit that executes, at predetermined timing, data copy processing including reading out, in page units, the user data stored in the second memory and sequentially writing the read-out user data in page units in the first memory; and
a data invalidation processing unit that, after the data copy processing, leaves first user data valid in the second memory, the first user data being data copied to the word line that has an empty page of the first memory by the data copy processing, and invalidates second user data in the second memory, the second user data being data copied to the word line that has no empty page of the first memory by the data copy processing.

2. The memory system according to claim 1, wherein the data invalidation processing unit updates and manages backup information for associating, for each of pages, the first user data in the second data and a writing destination address in the first memory of the first user data.

3. The memory system according to claim 2, wherein the data copy processing unit discriminates, based on the backup information, the user data stored in the second memory into the first user data subjected to the data copy processing and third user data not subjected to the data copy processing and executes the data copy processing on the third user data.

4. The memory system according to claim 3, wherein
the data invalidation processing unit updates and manages a valid/invalid flag that indicates whether the user data in pages units stored in the second memory is valid or invalid, and
the data copy processing unit executes, based on the valid/invalid flag, the data copy processing on valid user data among the third user data.

5. The memory system according to claim 1, wherein the predetermined timing is timing when user data for a predetermined number of pages is accumulated in the second memory.

6. The memory system according to claim 1, wherein the first memory is a NAND flash memory.

7. The memory system according to claim 1, wherein the data invalidation processing unit updates and manages a valid/invalid flag that indicates whether the user data in pages units stored in the second memory is valid or invalid.

8. The memory system according to claim 1, wherein the first user data left valid in the second memory is used as backup data prepared for destruction of the first user data stored in the word line of the first memory.

9. A controller mounted on a memory system including: a nonvolatile first memory in which a memory cell group per word line has a storage capacity for n (n≥2) pages; and a nonvolatile second memory that temporarily stores user data write-requested from a host apparatus, the controller comprising:
a data-copy processing unit that executes, at predetermined timing, data copy processing including reading out, in page units, the user data stored in the second memory and sequentially writing the read-out user data in page units in the first memory; and
a data invalidation processing unit that, after the data copy processing, leaves first user data valid in the second memory, the first user data being data copied to the word line that has an empty page of the first memory by the data copy processing, and invalidates second user data in the second memory, the second user data being data copied to the word line that has no empty page of the first memory by the data copy processing.

10. The controller according to claim 9, wherein the data invalidation processing unit updates and manages backup information for associating, for each of pages, the first user data in the second data and a writing destination address in the first memory of the first user data.

11. The controller according to claim 10, wherein the data copy processing unit discriminates, based on the backup information, the user data stored in the second memory into the first user data subjected to the data copy processing and third user data not subjected to the data copy processing and executes the data copy processing on the third user data.

12. The controller according to claim 11, wherein
the data invalidation processing unit updates and manages a valid/invalid flag that indicates whether the user data in pages units stored in the second memory is valid or invalid, and
the data copy processing unit executes, based on the valid/invalid flag, the data copy processing on valid user data among the third user data.

13. The controller according to claim 9, wherein the predetermined timing is timing when user data for a predetermined number of pages is accumulated in the second memory.

14. The controller according to claim 9, wherein the first memory is a NAND flash memory.

15. The controller according to claim 9, wherein the data invalidation processing unit updates and manages a valid/invalid flag that indicates whether the user data in pages units stored in the second memory is valid or invalid.

16. The controller according to claim 9, wherein the first user data left valid in the second memory is used as backup data prepared for destruction of the first user data stored in the world line of the first memory.

17. A data transfer method for data transfer between a nonvolatile first memory in which a memory cell group per word line has a storage capacity for n (n≥2) pages and a nonvolatile second memory that temporarily stores user data write-requested from a host apparatus, the data transfer method comprising:
executing, at predetermined timing, data copy processing including reading out, in page units, the user data stored in the second memory and sequentially writing the read-out user data in page units in the first memory;

leaving, after the data copy processing, first user data valid in the second memory, the first user data being data copied to the word line that has an empty page of the first memory by the data copy processing; and invalidating second user data in the second memory, the second user data being data copied to the word line that has no empty page of the first memory by the data copy processing.

18. The data transfer method according to claim 17, wherein the predetermined timing is timing when user data for a predetermined number of pages is accumulated in the second memory.

19. The data transfer method according to claim 17, wherein the first memory is a NAND flash memory.

20. The data transfer method according to claim 17, wherein the first user data left valid in the second memory is used as backup data prepared for destruction of the first user data stored in the word line of the first memory.

21. A memory system comprising:
a nonvolatile first memory;
a nonvolatile second memory that temporarily stores user data write-requested from a host apparatus;
a data-copy processing unit that executes, at predetermined timing, data copy processing including reading out, in page units, the user data stored in the second memory and sequentially writing the read-out user data in page units in the first memory; and
a data invalidation processing unit that, after the data copy processing, leaves first user data valid in the second memory, the first user data which is copied to the first memory by the data copy processing and is data with the possibility of being lost in the first memory by a memory access to the first memory, and invalidates second user data in the second memory, the second user data which is copied to the first memory and is data without the possibility of being lost in the first memory by the memory access to the first memory.

* * * * *